(12) United States Patent
Bender (10) Patent No.: US 11,414,016 B2
(45) Date of Patent: Aug. 16, 2022

(54) TAILGATE RETRACTABLE SIDE STEP

(71) Applicant: Frederick F Bender, South Lyon, MI (US)

(72) Inventor: Frederick F Bender, South Lyon, MI (US)

(73) Assignee: FCA US LLC, Auburn Hills, MI (US)

( * ) Notice: Subject to any disclaimer, the term of this patent is extended or adjusted under 35 U.S.C. 154(b) by 262 days.

(21) Appl. No.: 16/793,743

(22) Filed: Feb. 18, 2020

(65) Prior Publication Data
US 2021/0253030 A1 Aug. 19, 2021

(51) Int. Cl.
*B60R 3/02* (2006.01)
*B62D 33/023* (2006.01)

(52) U.S. Cl.
CPC .............. *B60R 3/02* (2013.01); *B62D 33/023* (2013.01)

(58) Field of Classification Search
CPC .................................. B60R 3/02; B62D 33/023
See application file for complete search history.

(56) References Cited

U.S. PATENT DOCUMENTS

| | | | | |
|---|---|---|---|---|
| 6,905,158 B1 * | 6/2005 | Bastian | .................... | B60R 3/02 280/164.1 |
| 7,090,276 B1 * | 8/2006 | Bruford | .................... | B60R 3/02 296/1.02 |
| 7,182,175 B1 | 2/2007 | Schmitt et al. | | |
| 7,261,357 B1 * | 8/2007 | Bechen | .................... | B60R 3/02 296/57.1 |
| 7,712,811 B2 * | 5/2010 | Heaman | ............. | B62D 33/0273 296/26.08 |
| 7,896,419 B2 * | 3/2011 | Elliott | ................ | B62D 33/0273 296/62 |
| 9,302,719 B1 * | 4/2016 | Krishnan | ........... | B62D 33/0273 |
| 10,005,396 B2 * | 6/2018 | Spahn | .................... | B62D 33/03 |
| 10,543,789 B1 * | 1/2020 | Hemphill | ........... | B62D 33/0273 |
| 2004/0113450 A1 * | 6/2004 | Fielding | ............... | B60N 2/3015 296/62 |
| 2007/0278039 A1 | 12/2007 | Sedlack | | |
| 2015/0336622 A1 * | 11/2015 | Worden | .................... | B60R 3/02 280/163 |
| 2017/0361878 A1 * | 12/2017 | Loew | ................. | B62D 33/0273 |

(Continued)

OTHER PUBLICATIONS

6 Step Wide Body Over Platform Telescoping Ladder, Url: https://www.garelick.com/6-Step-Wide-Body-Over-Platform-Telescoping-Ladder.

(Continued)

*Primary Examiner* — Bryan A Evans
(74) *Attorney, Agent, or Firm* — Ralph E. Smith (57) ABSTRACT

A step assembly for a tailgate of a vehicle, which includes a retractable rail secured to a housing located within the tailgate. The retractable rail is configured to extend from the housing and the tailgate when in a deployed state, and be entirely received within the housing and the tailgate when in a non-deployed state. A sliding stop device is positioned within the housing and connected to an end of the retractable rail. The stop device includes a tubular member having an aperture formed therein, and a movable arm located in the tubular member that is biased to extend outward from the aperture such that as the retractable rail is moved to the deployed state, the aperture of the sliding stop device is aligned with the opening of the housing, and the movable arm is engaged with the opening.

18 Claims, 8 Drawing Sheets

(56) References Cited

U.S. PATENT DOCUMENTS

2018/0065560 A1\* 3/2018 Krishnan .................. B60R 3/02
2018/0072242 A1\* 3/2018 Spahn ..................... B60R 11/06
2020/0109588 A1\* 4/2020 Nania .................... G07C 5/008

OTHER PUBLICATIONS

3-Step Flip-Up Telescoping Dive Ladder, Url: https://www.anchoring.com/products/3-step-flip-up-telescoping-dive-ladder.

\* cited by examiner

TAILGATE RETRACTABLE SIDE STEP

FIELD

The present disclosure relates tailgate retractable side step.

BACKGROUND

The cargo bed of a pickup truck, whether on a small and lightweight truck or a heavy-duty hauling truck, is considerably elevated above the ground. Access to the cargo bed is typically provided by a tailgate of some kind, and most often a tailgate that folds down into a position substantially coplanar with the floor of the cargo bed. This facilitates loading and unloading cargo from the truck, but it also creates a high step to get into the cargo bed physically to carry, place, move, adjust, secure, or remove a load. Ladders or steps that are attached to the tailgate have been developed to assist in gaining access to the cargo bed. Unfortunately, many of these devices are bulky and difficult to deploy.

SUMMARY

A step assembly for a tailgate of a vehicle, which includes a retractable rail secured to a housing located within the tailgate. The retractable rail is configured to extend from the housing and the tailgate when in a deployed state, and be entirely received within the housing and the tailgate when in a non-deployed state. A sliding stop device is positioned within the housing and connected to an end of the retractable rail. The stop device includes a tubular member having an aperture formed therein, and a movable arm located in the tubular member that is biased to extend outward from the aperture such that as the retractable rail is moved to the deployed state, the aperture of the sliding stop device is aligned with the opening of the housing, and the movable arm is engaged with the opening.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
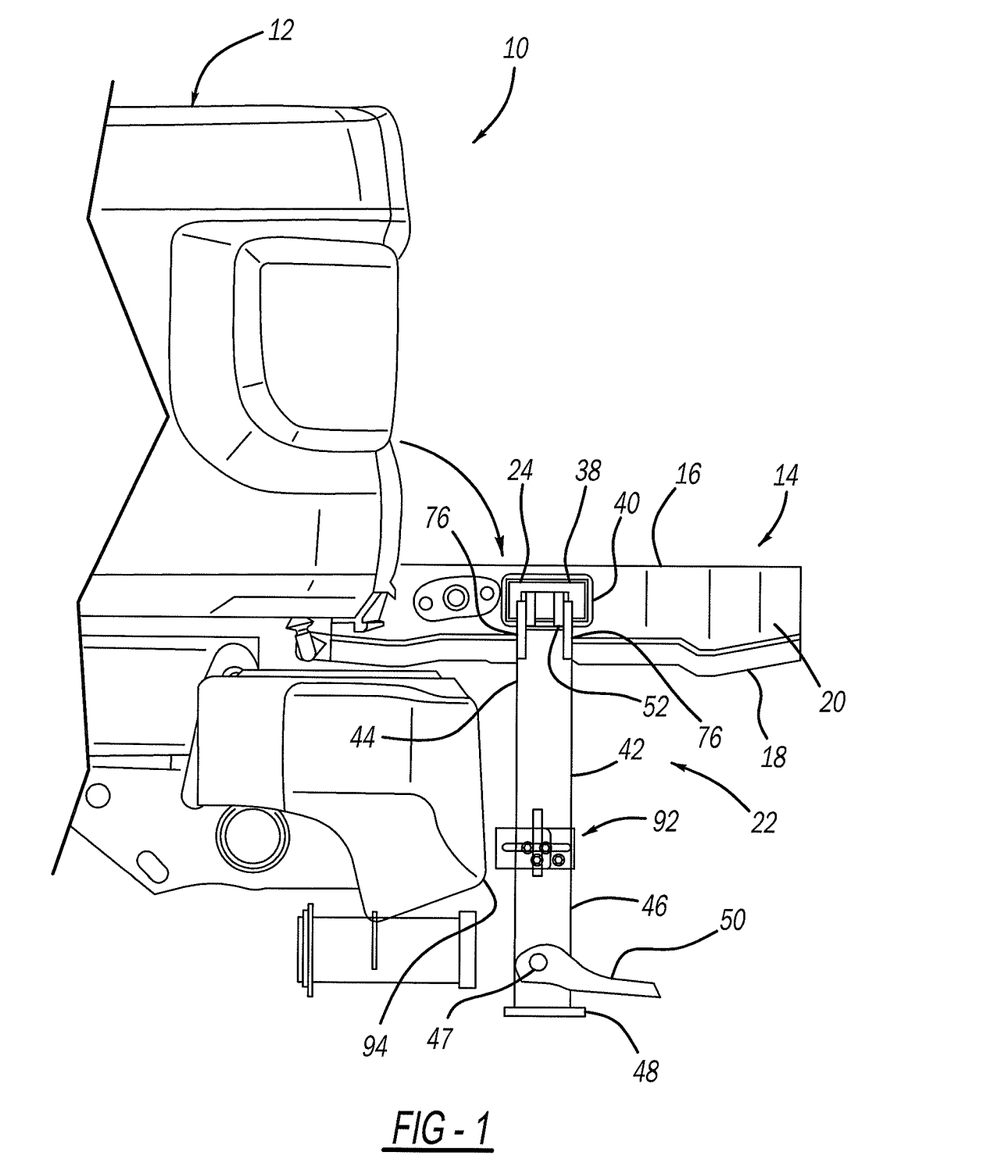
FIG. 1 is a perspective view of a retractable side step assembly in a deployed state.

FIG. 1 illustrates a vehicle 10 such as a pickup truck that includes a bed 12 and a tailgate 14. As is known in the art, tailgate 14 is movable between a vertical (closed) and horizontal (open) positions. Tailgate includes an inner panel 16 that, when tailgate 14 is in the vertical position, faces an interior of bed 12, an exterior panel 18 that, when tailgate 14 is in the horizontal position, faces the ground, and a pair of side panels 20 that connect inner panel 16 and exterior panel 18. Collectively, inner panel 16, exterior panel 18, side panels 20 define a hollow interior of tailgate 14 that houses a retractable side step assembly 22 according to the present disclosure.

Figure 2:
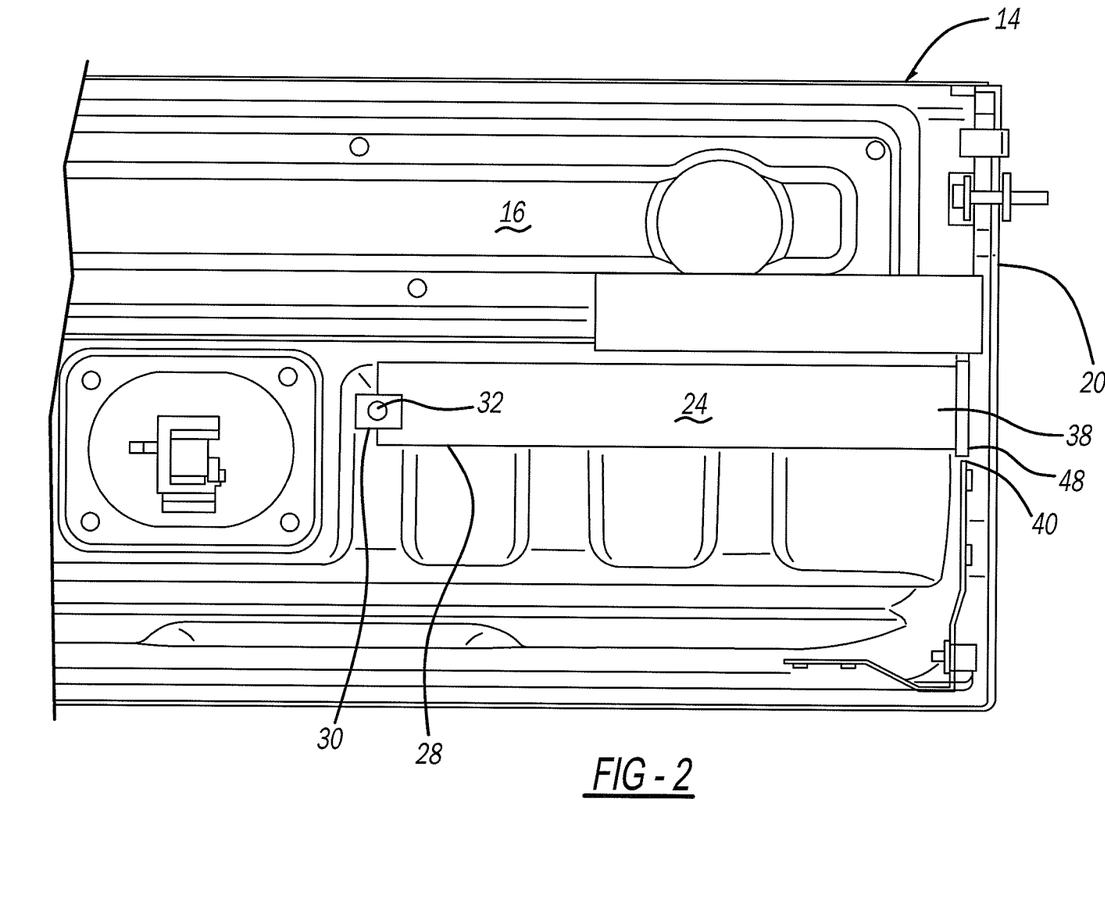
FIG. 2 is a perspective view of a tailgate with an interior panel removed to illustrate a housing of the retractable side step assembly.
Figure 3:
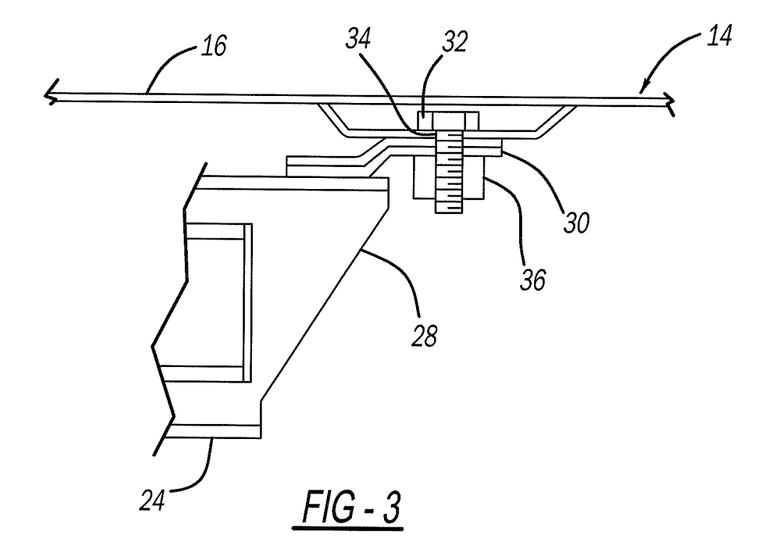
FIG. 3 is a partial cross-sectional view of the housing illustrated in FIG. 2 illustrating the connection between the housing and the tailgate.

As best shown in FIGS. 2 and 3, retractable side step assembly 22 includes a housing 24 secured within the hollow interior of tailgate 14. It should be understood that in FIG. 2, a portion of inner panel 16 has been removed to illustrate housing 24 stored within tailgate 14. Housing 24 may be a rectangular tubular member formed of a rigid metal material such as aluminum, steel, titanium or the like. As best shown in FIG. 3, housing 24 has a first end 28 secured to inner panel 16 by a mounting bracket 30 that is secured to first end 28 by welding or some other type of attachment mechanism. Mounting bracket 30 may be secured to inner panel 16 by a fastener 32 such a bolt. In this regard, inner panel 16 may include an aperture 34 formed therein that is configured for receipt of fastener 32 that aligns with a threaded through-hole 36 of mounting bracket 30. It should be understood, however, that other methods of attaching tubular member 26 to inner panel 16, such as welding, brazing, or some other type of attachment method, are contemplated. A second end 38 of housing 24 extends toward one of the side panels 20. As best shown in FIG. 1, side panel 20 has an aperture 40 that is shaped to correspond to and align with a cross-sectional shape of housing 24.

Figure 4:
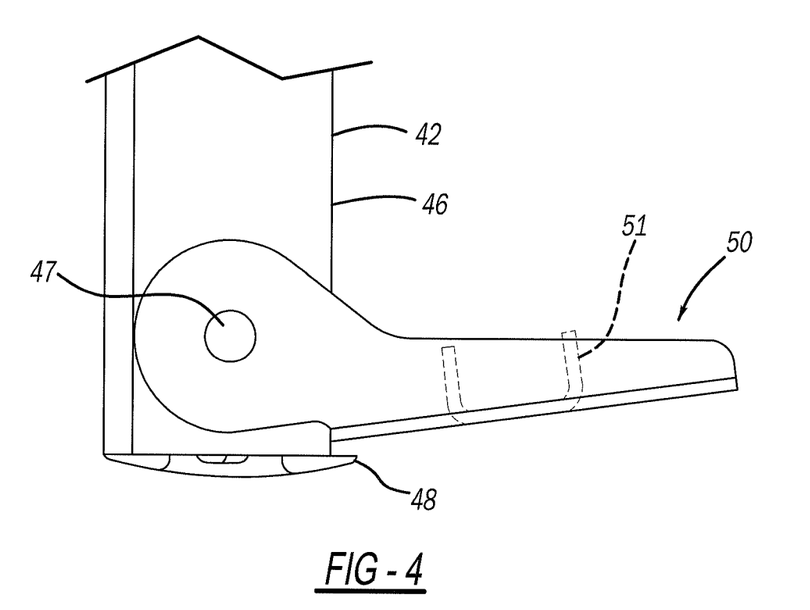
FIG. 4 illustrates a step of the retractable side step assembly in a deployed state.
Figure 5:
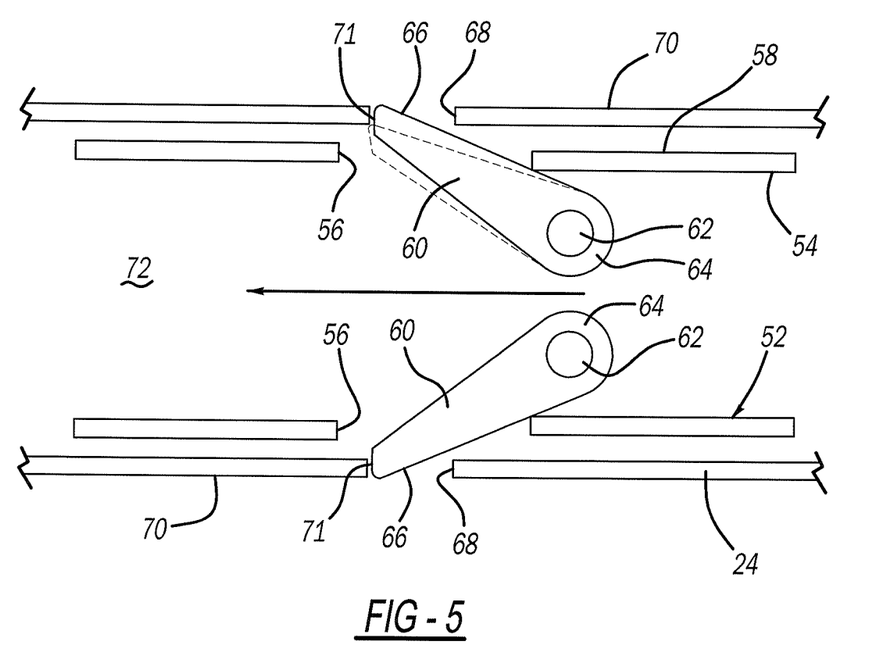
FIGS. 5 and 6 are partial cross-sectional views of a sliding stop device of the retractable side step assembly.
Figure 6:
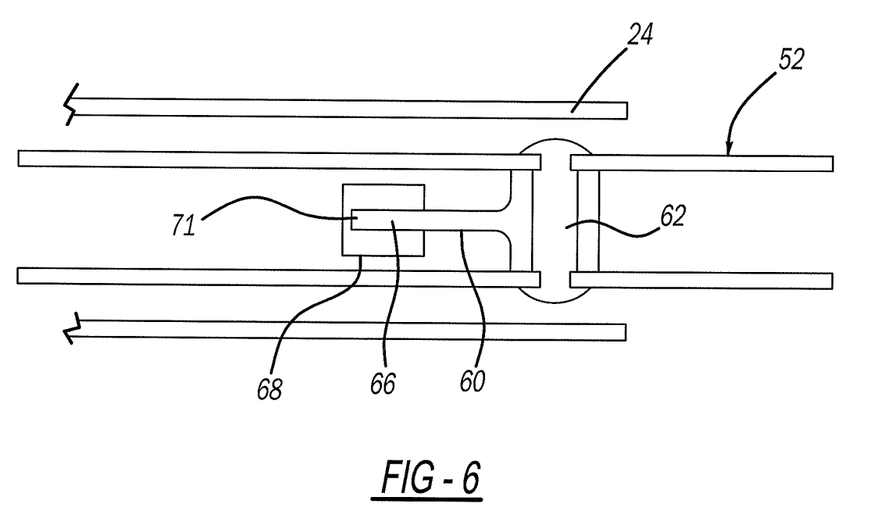

Assembly 22 includes a rail 42 that is slidably received within housing 24. Like housing 24, rail 42 may be a rectangular tubular member formed of a rigid metal material such as aluminum, steel, titanium or the like. The dimensions of rail 42 are such that rail 42 is spaced apart from housing 24 when rail 42 is received within housing 24. When tailgate 14 is opened (i.e., in a horizontal position), rail 42 may be pulled from housing 24 outward from side panel 20 of tailgate 14. Once extended outward from tailgate 14, rail 42 may be pivoted in a direction toward the ground. In this regard, rail 42 includes a proximal end 44 that can be pivoted relative to housing 24, and a distal end 46 that includes an end cap 48 and a step 50 that is pivotably attached to distal end 46 by pin 47. Thus, when rail 42 is pulled from housing 24 outward from tailgate 14 and pivoted toward the ground, step 50 may be pivoted to extend outward from rail 42 to allow for easier entry into bed 12. As best shown in FIG. 4, step 50 may include a U-shaped protrusion 51 that acts as a gripping feature for step 50.

Figure 7:
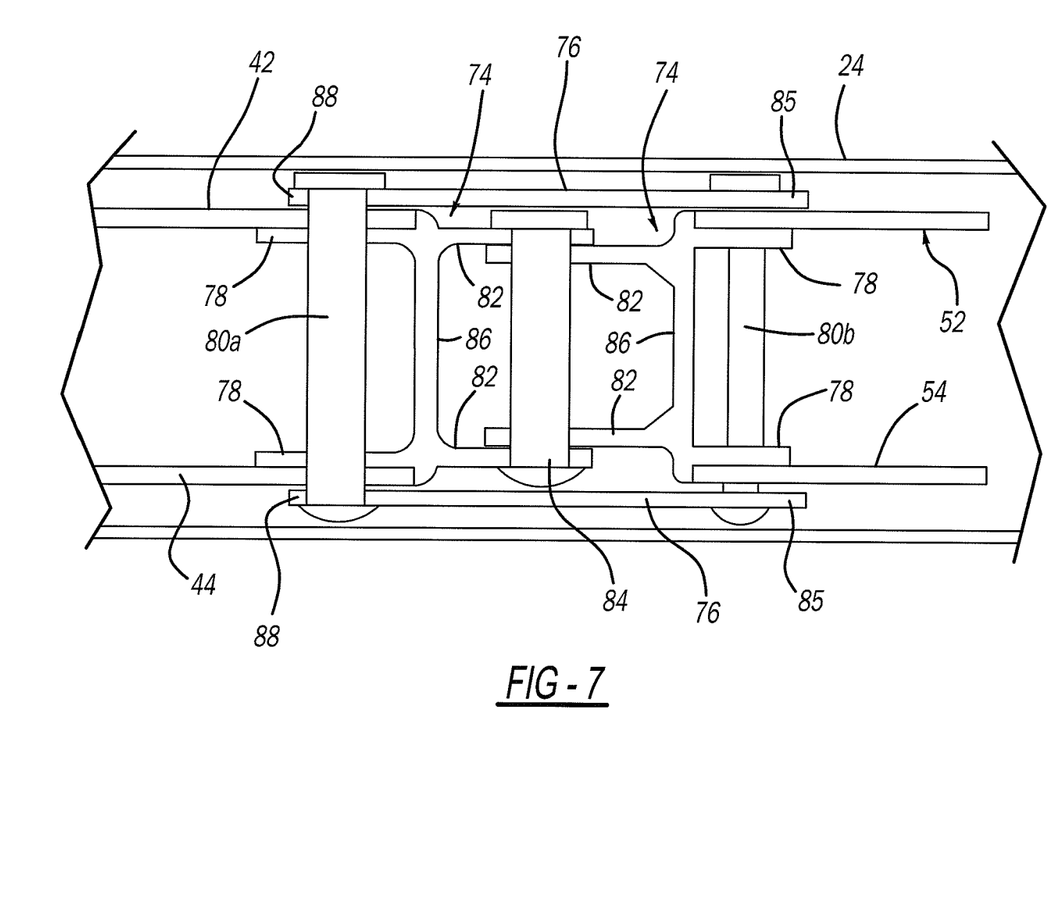
FIGS. 7 and 8 are partial cross-sectional views of retractable side step assembly illustrating a connection between a rail of the side step assembly and the sliding stop device.

As best shown in FIGS. 5 to 8, proximal end 44 of rail 42 is pivotably attached to a sliding stop device 52 that is slidably received within housing 24 (FIG. 7). Stop device 52 includes a rectangular tube 54 having a pair of apertures 56 formed in side surfaces 58 thereof. A pair of spring-loaded arms 60 are pivotably attached to tube 54 by rivets 62 at locations proximate apertures 56. In this regard, arms 60 have a first end 64 connected to tube 54 at rivets 62, and a second end 66 that is biased to extend outward from apertures 56. In addition, housing 24 includes a pair of openings 68 formed in side surfaces 70 thereof that are configured to be engaged by arms 60. More particularly, as rail 42 and stop device 52 are slid outward form housing 24, apertures 56 will eventually align with openings 68. Because second end 66 is biased to extend outward from apertures 56, an engagement surface 71 of second end 66 of arms will engage openings 68 and prevent stop device 52 from being further moved relative to housing 24. When rail 42 and stop device 52 are moved in the opposite direction (i.e., to stow rail 42 and step 50), arms 60 will be forced to pivot in a direction toward an interior 72 of tube 54 and permit rail 42 and stop device 52 to be entirely received within housing 24.

Figure 8:
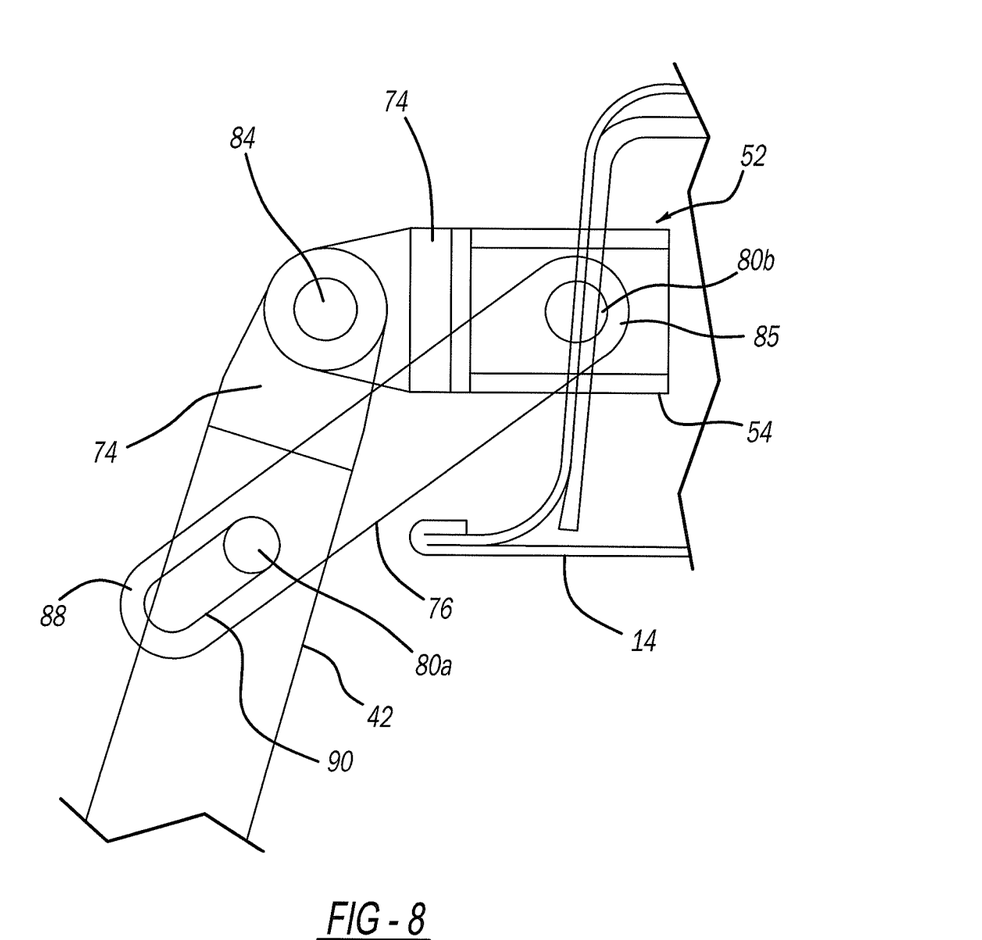

As best shown in FIGS. 7 and 8, rail 42 is pivotably attached to tube 54 of stop device 52 by a pair of brackets 74 and a pair of link members 76. Brackets 74 are unitary members that may be formed of a rigid material such as steel, aluminum, or titanium, and each include a first pair of arms 78 attached to rail 42 and tube 54, respectively, by bolts 80a and 80b. Brackets 74 also each include a second pair of arms 82 that are attached to each other by a pivot pin 84. A support arm 86 arranged transverse to first arms 78 and second arms 82 connects first arms 78 to second arms 82. A spacing between second arms 82 that are part of bracket 74 attached to stop device 52 is narrower so as the fit between the second arms 82 of the bracket 74 that is attached to rail 42 at pivot pin 84.

Link members 76 are elongate plates that may be formed of a rigid material such as steel, aluminum, or titanium. A first end 85 of each link member 76 is attached tube 54 of stop device 52 by bolt 80b, and a second end 88 is attached to rail 42 by bolt 80a. Second end 88 of link members 76 includes a slot 90 that permits rail 42, bracket 74, and bolt 80a to move therealong, which provides an amount of play for rail 42 relative to tailgate 14.

Figures 9, 10:
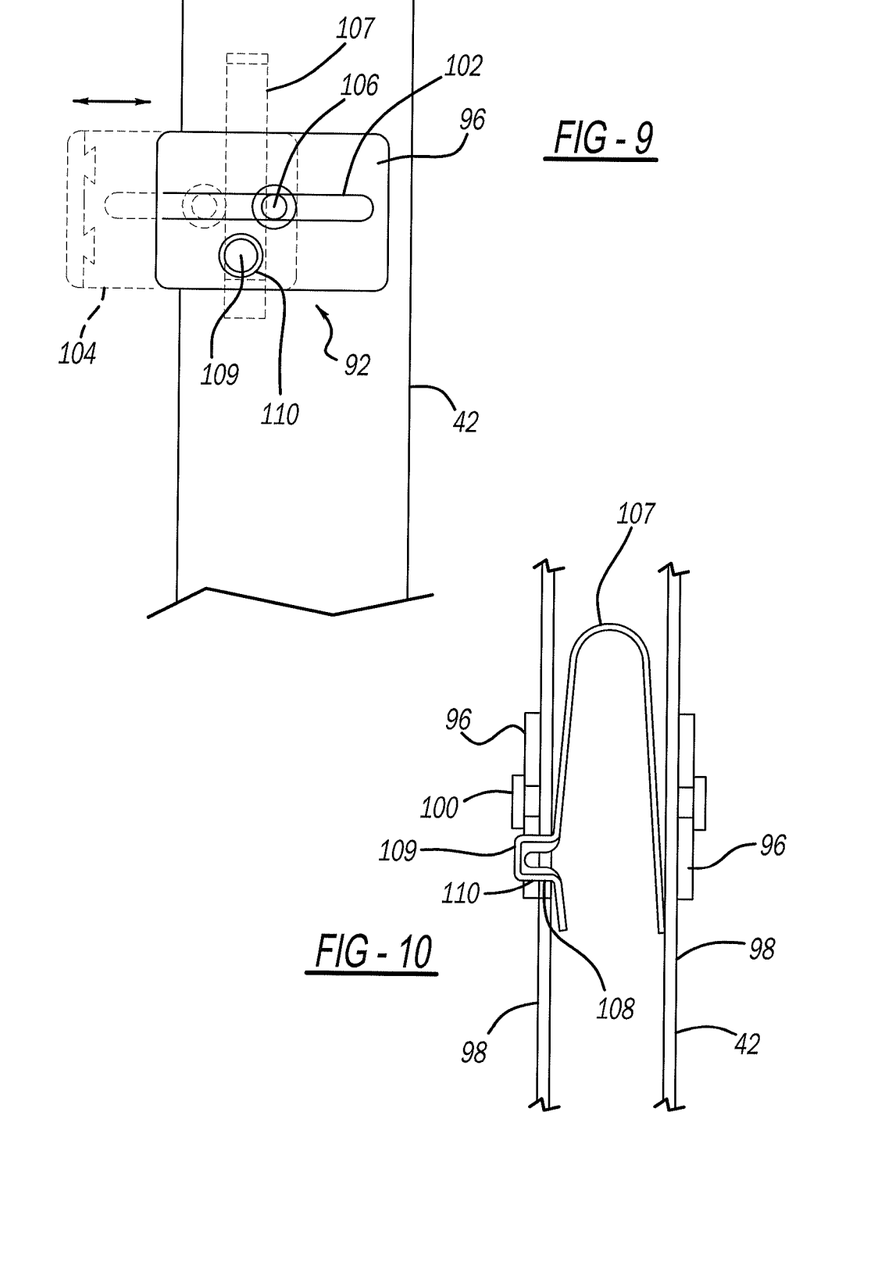
FIGS. 9 and 10 illustrate a bumper stop pad assembly of the retractable side step assembly.

Now referring to FIGS. 9 and 10, it can be seen that retractable side step assembly 22 includes a bumper stop pad assembly 92 mounted to rail 42 at a location that, when retractable side step assembly 22 is fully deployed form tailgate 14, will coincide with a bumper 94 of the vehicle 10 (FIG. 1). Bumper stop pad assembly 92 includes a pair of mounting plates 96 attached to opposing surfaces 98 of rail 42 by a rivet 100. Plates 96 include an elongated slot 102. A bumper stop pad 104 is secured to slots 102 of plates 96 by a pin 106 that permits bumper stop pad 104 to move toward and away from rail 42. In this regard, bumper stop pad assembly 92 may be seated against rail 42 when retractable side step assembly 22 is to be stowed within tailgate 14 so as to not interfere with housing 24. Conversely, bumper stop pad assembly 92 may be extended outward from rail 42 when retractable side step assembly 22 is fully deployed to provide a cushion against bumper 94 of vehicle 10. A spring 107 may be located within rail 42 and attached to one of the plates 96 via an opening 108 formed in rail 42 and an aperture 110 formed in one of the plates 96. Upon depression of a button 109 attached to or formed from spring 107 that is seated in aperture 110, bumper stop pad 104 is permitted to move away from rail 42.

Figure 11:
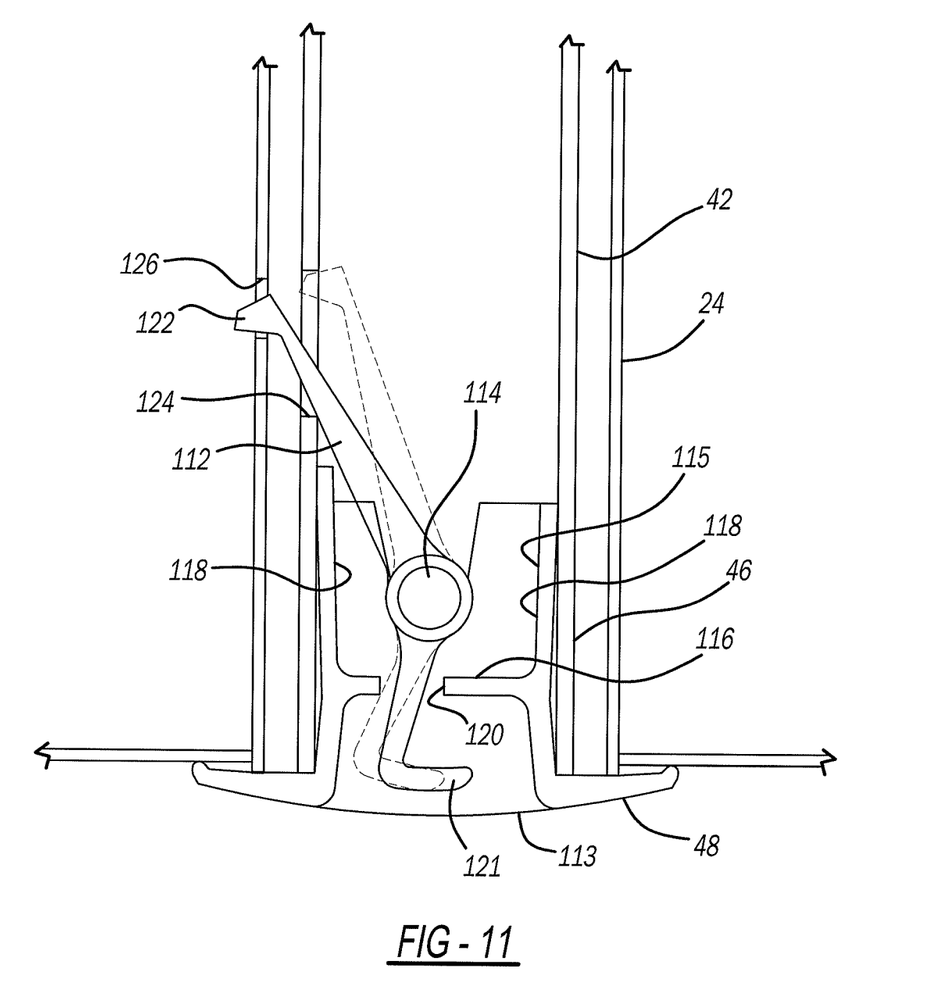
FIG. 11 is a partial cross-sectional view of an end cap and locking mechanism that secures the retractable side step assembly within the housing.

Now referring to FIG. 11, it can be seen that end cap 48 houses a locking lever 112 for securing retractable side step assembly 22 within housing 24 when assembly 22 is not in use. End cap 48 may be attached to rail 42 by a spring-biased retaining pin 114 that also acts as a pivot point for locking lever 112. End cap 48 includes a face plate 113 that extends outward from distal end 46 of rail 42, and a sleeve 115 that extends from face plate 113 into distal end 46 of rail 42. A wall 116 extends between opposing sides 118 of sleeve 114 including a central through-hole 120. Locking lever 112 includes a finger grip 121 that extends through central through-hole 120, and a locking end 122 that extends into rail 42. Rail 42 includes an aperture 124 that aligns with a locking port 126 of housing 24. Thus, when rail 42 is inserted into housing 24 to stow side step assembly 22, aperture 124 will align with locking port 126. At this time, locking lever 112 will be forced to rotate counter-clockwise due to spring-biased retaining pin 114 to engage locking end 122 with locking port 126 to prevent rail 42 from being pulled outward from housing 24 and tailgate 14 unless desired. To remove assembly 22 from housing 24, finger grip 121 may be manually actuated to overcome the force exerted by spring-biased retaining pin 114 and rotate lever 112 clockwise to disengage locking end 122 from locking port 126, at which time rail 42 may be pulled from housing 24 to deploy assembly 22 to the extended and pivoted position relative to tailgate 14. It should be understood that a torsion spring (not shown) can alternatively be used to provide the spring bias provided by retaining pin 114. In such a configuration, retaining pin 114 would mere act as a pivot point for lever 112.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A step assembly for a tailgate of a vehicle, comprising:
   a housing located within an interior of the tailgate, and including an opening in a side surface thereof;
   a retractable rail secured to the housing, the retractable rail configured to extend from the housing and the tailgate when in a deployed state, and configured to be entirely received within the housing and the tailgate when in a non-deployed state;
   a bumper stop pad mounted to the retractable rail; and
   a sliding stop device positioned within the housing and connected to an end of the retractable rail, the stop device including a tubular member having an aperture formed therein, and a movable arm located in the tubular member and biased to extend outward from the aperture,
   wherein as the retractable rail is moved from the non-deployed to the deployed state, the aperture of the sliding stop device is aligned with the opening of the housing, and the movable arm that extends outward from the aperture is engaged with the opening.

2. The step assembly according to claim 1, wherein the retractable rail is pivotably connected to the sliding stop device such that when the retractable rail is in the deployed state, the retractable rail can be pivoted relative to the tailgate toward the ground.

3. The step assembly according to claim 1, further comprising a step attached to the retractable rail, the step being pivotable relative to the retractable rail.

4. The step assembly according to claim 1, wherein the bumper stop pad is mounted to the retractable rail by a pair of mounting plates that permit the bumper stop pad to be moved towards and away from retractable rail.

5. The step assembly according to claim 1, further comprising a locking lever positioned within the retractable rail that is configured to lock the retractable rail to the housing when the retractable rail is in the non-deployed state.

6. The step assembly according to claim 5, wherein the locking lever includes a finger grip end that extends through an end cap of the retractable rail that is configured for manually manipulating the locking lever between a locked and unlocked position.

7. The step assembly according to claim 5, wherein the locking lever includes a lock ending end that is configured to engage with a locking port formed in the housing.

8. The step assembly according to claim 1, wherein the housing includes a mounting bracket that is secured to the tailgate by a fastener.

9. A step assembly for a tailgate of a pickup truck, comprising:
   an elongated tubular housing located within an interior of the tailgate, and including a pair of openings formed in opposing side surfaces thereof;
   an elongated tubular retractable rail slidably received within the housing, the retractable rail configured to extend from the housing and the tailgate when in a deployed state, and configured to be entirely received within the housing and the tailgate when in a non-deployed state;
   a locking lever positioned within the retractable rail that is configured to lock the retractable rail to the housing when the retractable rail is in the non-deployed state;
   a sliding stop device positioned within and slidable relative to the housing and hingedly connected to an end of the retractable rail, the stop device including a tubular member having a pair of opposing apertures formed therein, and a pair of movable arms located in the tubular member that are spring-biased to extend outward from the opposing apertures; and
   a step pivotably attached to an end of the retractable rail;
   wherein as the retractable rail is moved from the non-deployed to the deployed state, the apertures of the sliding stop device are aligned with the openings of the housing, and the movable arms that extend outward from the apertures are engaged with the openings to prevent further movement of sliding stop device and the retractable rail relative to the housing.

10. The step assembly according to claim 9, wherein the retractable rail is hingedly connected to the sliding stop device by a pair of brackets that are each connected to a pivot pin such that when the retractable rail is in the deployed state, the retractable rail can be pivoted relative to the tailgate toward the ground.

11. The step assembly according to claim 9, further comprising a bumper stop pad mounted to the retractable rail.

12. The step assembly according to claim 11, wherein the bumper stop pad is mounted to the retractable rail by a pair of mounting plates that permit the bumper stop pad to be moved towards and away from retractable rail.

13. The step assembly according to claim 9, wherein the locking lever includes a finger grip end that extends through an end cap of the retractable rail that is configured for manually manipulating the locking lever between a locked and unlocked position.

14. The step assembly according to claim 9, wherein the locking lever includes a lock ending end that is configured to engage with a locking port formed in the housing.

15. The step assembly according to claim 9, wherein the housing includes a mounting bracket that is secured to the tailgate by a fastener.

16. A step assembly for a tailgate of a vehicle, comprising:
   a housing located within an interior of the tailgate, and including an opening in a side surface thereof;
   a retractable rail secured to the housing, the retractable rail configured to extend from the housing and the tailgate when in a deployed state, and configured to be entirely received within the housing and the tailgate when in a non-deployed state;
   a sliding stop device positioned within the housing and connected to an end of the retractable rail, the stop device including a tubular member having an aperture formed therein, and a movable arm located in the tubular member and biased to extend outward from the aperture;
   a step pivotably attached to an end of the retractable rail; and
   a locking lever positioned within the retractable rail that is configured to lock the retractable rail to the housing when the retractable rail is in the non-deployed state,
   wherein the locking lever includes a finger grip end that extends through an end cap of the retractable rail that is configured for manually manipulating the locking lever between a locked and unlocked position, and configured for pulling the retractable rail from the housing; and
   wherein as the retractable rail is moved from the non-deployed to the deployed state, the aperture of the sliding stop device is aligned with the opening of the housing, and the movable arm that extends outward from the aperture is engaged with the opening to prevent further movement of sliding stop device and the retractable rail relative to the housing.

17. The step assembly according to claim 16, wherein the retractable rail is hingedly connected to the sliding stop device by a pair of brackets that are each connected to a pivot pin such that when the retractable rail is in the deployed state, the retractable rail can be pivoted relative to the tailgate toward the ground.

18. The step assembly according to claim 16, further comprising a bumper stop pad mounted to the retractable rail.

\* \* \* \* \*